June 15, 1948.  B. BURNS  2,443,574
CAPILLARY DIP BRAZING PROCESS
Filed May 5, 1944  2 Sheets-Sheet 1
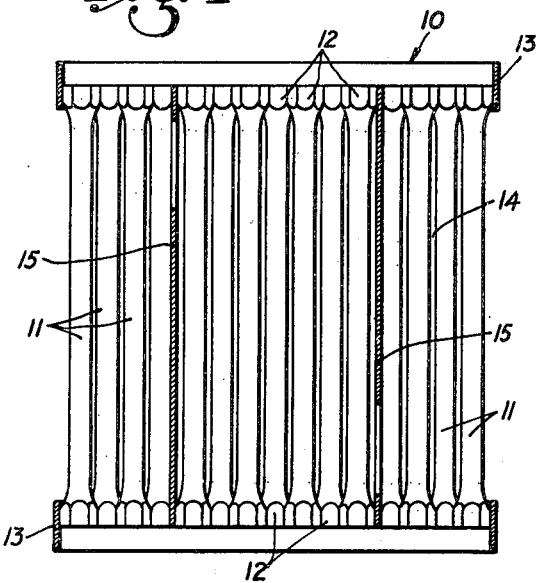
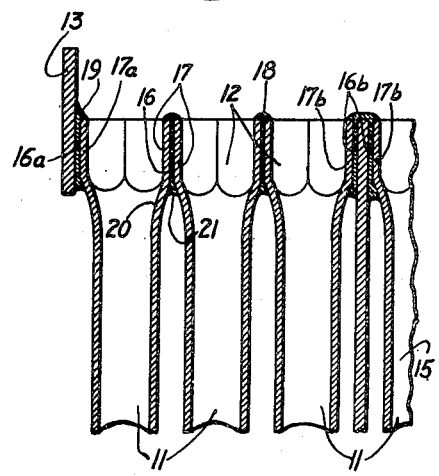
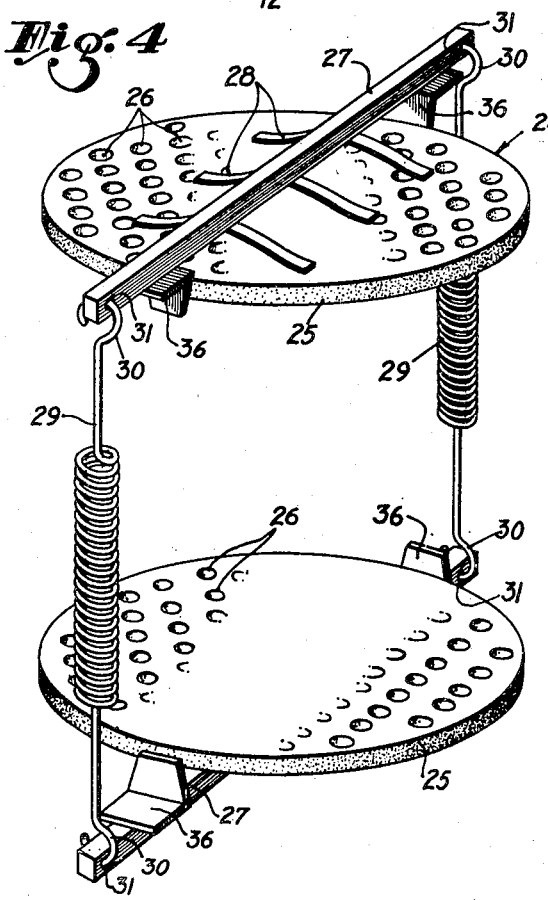
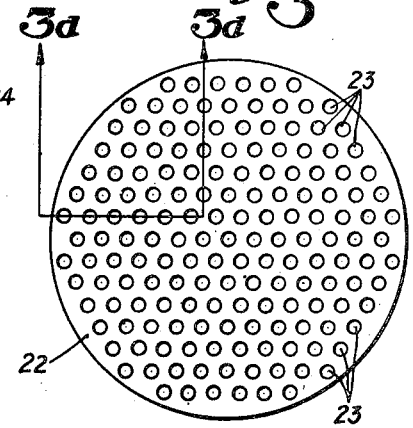
INVENTOR.
BRUCE BURNS.
BY
Attorney

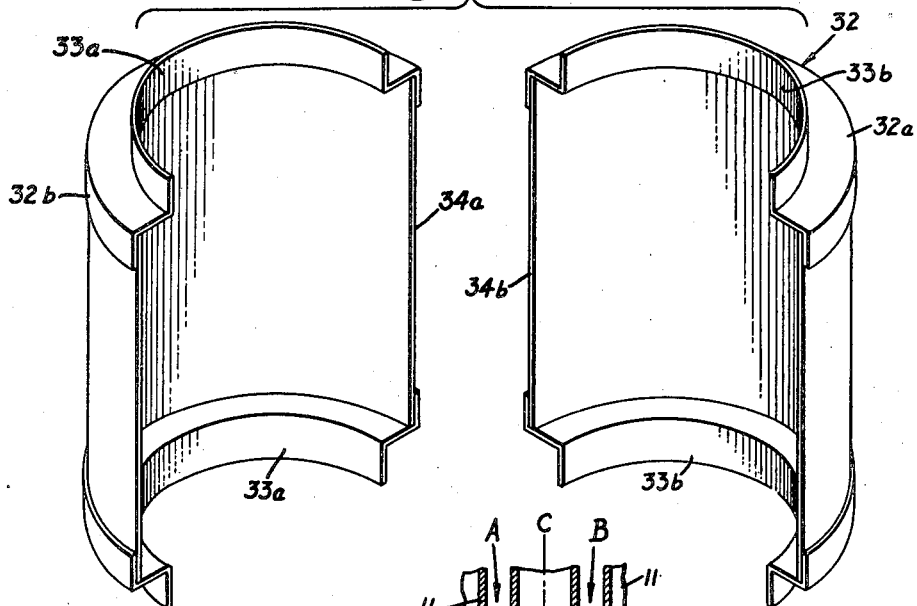
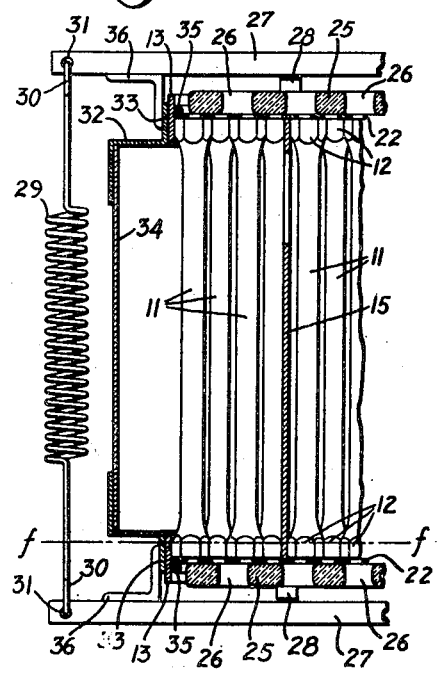
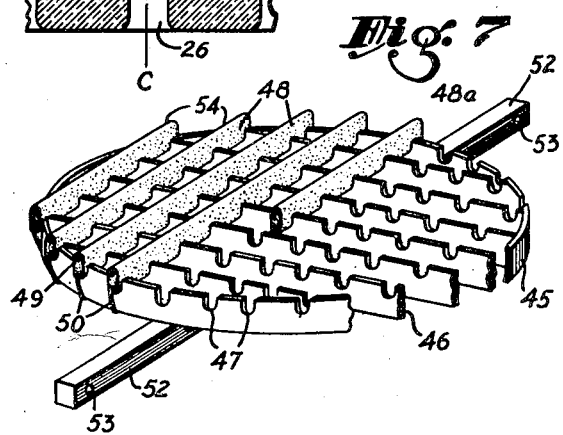

Patented June 15, 1948

2,443,574

UNITED STATES PATENT OFFICE 2,443,574

CAPILLARY DIP BRAZING PROCESS

Bruce Burns, West Los Angeles, Calif., assignor to The Garrett Corporation, Airesearch Manufacturing Company division, Los Angeles, Calif., a corporation of California Application May 5, 1944, Serial No. 534,254

6 Claims. (Cl. 113—112)

My invention relates to the art of brazing or soldering together at the end of a plurality of parts which are held together so as to form an assembly, and relates particularly to a method of brazing the end of an assembly of tubes forming the core of an oil cooler of the type used in conjunction with aircraft engines.

My present method is especially adapted for the brazing of the ends of tubes which are made from aluminum or an aluminum alloy, but after a review of this disclosure, it will be evident that the method may be used for brazing other metals. The expression "brazing" as used herein is differentiated from brazing as more commonly used in the ferrous and other non-ferrous arts, and to also differentiate between brazing and soldering in the art of joining aluminum or aluminum alloy parts.

In its original usage "brazing," as the derivation of the word itself would suggest, referred to the joining of metals by the use of brass alloys of lower melting point than the metals being joined. Such brazing procedures were usually carried out with brasses having melting points between 1300° F. and 1500° F. and were applicable to joining of ferrous parts one to another or non-ferrous parts one to another, when the melting points of these non-ferrous parts were a few hundred degrees higher than the melting point of the brazing alloy, and also to the joining of ferrous to non-ferrous parts. With expansion of various fabricating industries, it became desirable to use brazing processes on materials having lower melting points, or to effect brazing operations at lower temperatures than theretofore used to avoid undesirable heating effects on the parts being joined. This led to the development of the "silver solders" or hard solders which, because of their composition, could not be properly classified as brasses. Since the essential procedures and techniques in the use of these silver solders were similar to those used in the higher temperature brazing operation with brasses, and since some of the silver solders often had a brassy appearance, the expression "brazing" was also applied to the work done with silver solders.

When materials and techniques were developed for joining the common aluminum alloys by using a special aluminum alloy of lower melting point in conjunction with special fluxes, the misnomer "brazing" was then applied to this work. To those familiar with the aluminum brazing processes, the use of the word is entirely understood, but for those perhaps familiar only with brazing in its original and true sense, clarification is often required.

Just as the term "brazing," when applied to the aluminum alloys, has come by usage to connote the use of high aluminum content filler or joining material having a melting point not far below that of the aluminum parts to be joined, so the expression "soldering" has been applied to and understood to describe processes in which the joining material has a materially lower melting point than the parts to be joined (350° F. to 650° F.), and is an alloy in which there may be little or no aluminum present.

An important difference between the brazed aluminum assembly and the soldered aluminum assembly is that the former is reasonably resistant to corrosion while the latter is seriously subject to such action. This is due to the electrochemical influences of the high percentages of non-aluminum metals in the solder. Another important difference, which is also an indication of the greater electro-chemical action where solder is used, appears in application of the conventional anodic treatment to brazed or soldered assemblies. This is an electrolytic process which can easily be used without difficulty in the case of brazed assemblies, but in the case of soldered assemblies will usually lead to extreme acceleration of the electro-chemical corrosion effect with the result that the original aluminum parts or the joining solder may be largely or completely destroyed during the anodizing treatment. Since it is desirable, if not imperative, that aluminum assemblies for use in aircraft be anodized or similarly treated, the desirability of brazing rather than soldering is emphasized. Similarly, even though not anodized, it is of course important that the assembly should be as resistant as possible to corrosion, with the result that the use of solder is ordinarily prohibited by all aircraft specifications.

Considerable difficulty has been encountered in brazing aluminum for the reason that the metal has the characteristic of rapidly passing from the solid through the plastic stage to liquid stage as its melting point is approached and reached, and the brazing material or filler has a melting point which approaches relatively close to the melting point of aluminum. For example, the aluminum metal on which this method is extensively used has a melting point of about 1200° F. and the filler or brazing material now obtainable for use therewith has the melting point not greatly lower than the melting point of the aluminum metal. One of the filler metals suitable for this purpose has a melting point of 1075° F., and another has a melting point somewhat higher than this. This means that the brazing operation must be carried on at a temperature which approaches very close to the melting point of the aluminum metal, making it very difficult when using old brazing operations to consistently obtain commercially acceptable bonds between the brazed parts. A further difficulty encountered in the brazing of aluminum results from the highly corrosive character of the flux compound which must be employed. This flux rapidly erodes the aluminum so that when ordinary brazing methods are employed on thin walled aluminum tubes, destruction of the end portions of the tubes rapidly occurs and the walls are so weakened that they fail under the conditions of service to which they are later subjected. It is also found in brazing thin aluminum walls that the edges of the walls will melt away or become rough and jagged. This is believed to be principally due to the rapidity at which the aluminum alloys with the filler metal in the presence of the flux, thereby producing at the extreme ends of the thin aluminum wall an aluminum alloy having a melting point lower than the melting point of the original aluminum.

It is an object of the present invention to provide a process and apparatus for brazing thin-walled metal tube ends which will obtain strong, leakproof, and economical bonds between the brazed members.

It is an object of the invention to provide a method and apparatus for brazing wherein a measured quantity of filler metal is employed so that the interstices between the tube ends will be properly filled without an excess of the filler metal being deposited in the assembly of tubes. In the dip brazing method of the prior art known to the inventor, many of the brazed joints obtained have either a deficiency or an excess of the filler metal owing to the fact that in such old methods accurate control of of the quantity of filler metal deposited in the joints is not obtained.

A further object of the invention is to provide a process of brazing wherein the flux is maintained in contact with the metal being brazed for only a very short period of time. Therefore, etching of the metal is minimized and the strength of the tube or walls is maintained at a high value.

A further object of the invention is to provide a method of brazing the ends of tubes wherein the flux is brought into contact with substantially only the limited portions of the tube parts to which the filler is to adhere.

A further object of the invention is to provide a method wherein either of or both the flux and the molten filler are drawn into the interstices between the tube ends by a capillary action and in quantities designed to accomplish the brazing operation with the greatest efficiency and economy.

It is an important object of the invention to permit accurate weight control of the brazed assembly. This is important in any air-borne item, and is readily achieved in this process since the amount of filler material can be definitely predetermined.

Another important object of the invention is that by proper proportioning of the amount of filler to the size, length, and particular contour of hexagon end, the exact amount of filler material will be supplied to produce uniform, smooth, and fully rounded fillets which will minimize stress concentration at the junctures of brazing material with tubes, and facilitate thorough washing after brazing to insure complete removal of brazing flux.

Another object of the invention is to obtain maximal heat transfer from any given overall length of tube by using hexagon sections of the least possible axial length consistent with economical manufacturing operations, and limiting the amount of filler to that necessary for joining the hexagon surfaces together and forming adequate fillets behind them in the zone where the transition from hexagon to cylindrical tube occurs.

Further objects and advantages of the invention will be brought out in the following part of the specification.

Referring to the drawings which are for illustrative purposes only,

Fig. 1 is a partly sectional elevational view of a cooler core made by use of my invention.

Fig. 2 is an enlarged fragmentary sectional view of one corner of Fig. 1.

Fig. 3 is a face view of a body of filler material used in the preferred practice of my invention.

Fig. 3a is an enlarged sectional view taken as indicated by the line 3a—3a of Fig. 3, showing burr-pierced holes in filler sheet.

Fig. 4 is a perspective view showing a holder for holding the bodies of filler material against the ends of the tube assembly.

Fig. 4a is a view showing muff members in perspective.

Fig. 5 is an enlarged fragmentary section showing the manner in which the filler material is held against the ends of the tube assembly.

Fig. 6 is an enlarged fragmentary sectional view illustrating two important steps in the practice of the invention.

Fig. 7 is a fragmentary view showing an alternative form of filler holding means.

In Fig. 1 I have shown a filler core 10 comprising a plurality of tubes 11 in spaced relation with the ends 12 thereof in engagement and secured together by thin layers of filler. Around the ends 12 are cylindrical walls 13 which, due to their small width, may be referred to as bands. These bands 13 hold the tube ends together prior to and during the brazing operation, and afterward serve as means whereby the ends of the core 10 may be secured to the wall of a cooler shell (not shown). These bands 13, if desired, may constitute the ends of a cooler shell. In keeping with accepted practice in the manufacture of oil coolers, the tube ends 12 are hexagonal and are slightly enlarged so that when the ends of the tubes are in engagement, spaces 14 will be provided between the tube bodies through which the oil to be cooled may pass in engagement with the external surfaces of the tube bodies. The core 10 also includes baffle plates 15 which divide the tubes into groups and divide the interior of the cooler core into connected spaces or channels through which the oil passes in sequential order from the inlet opening to the outlet opening of the cooler.

As shown in Fig. 2, thin layers of filler 16 join the adjacent walls 17 of the tube ends 12. A similar layer 16a of filler connects the band 13 with the peripheral walls 17a of the tube assembly, and walls 16b of filler join the ends of the baffle plates 15 with the adjacent walls 17b of proximate tube ends. It will be noted that for the purpose of illustration, Fig. 2 shows the filler layer 16, 16a, and 16b as having appreciable thickness. It will be understood, however, that the thickness of the filler layers may vary from less than a thousandth of an inch to greater than a thirty-second of an inch, depending upon the spaces between adjacent tube ends. In the practice of the invention, beads 18 of the filler material are usually formed along the lips of the walls 17, 17b and 15, and a fillet 19 is formed at the outer edge of the filler wall 16a between the band 13 and the periphery of the assembly of tube ends. A feature of the invention is that the bonding or joining walls of filler material 16, 16a and 16b fill the interstices between the walls of the tube ends 12 and form fillets 21 at the points or lines of transition 20 where the tube ends 12 taper or decrease in diameter and merge with the bodies of the tubes 11. These fillets 21 reenforce the tube ends and also serve as sealing means for preventing escape of fluid under pressure from the spaces 14 between the bodies of the tubes.

As a part of the invention, for carrying out my new process, I provide a body of flux-pervious filler 22. By "flux-pervious" I mean that the body of filler material has openings or spaces through which flux may pass from one face of the assemblage of filler material to the opposite face thereof. This body 22 of filler material preferably consists of a thin disc having small openings 23 therethrough in evenly spaced arrangement as shown in Fig. 3. Since the face of the tube assemblage cannot be kept perfectly flat with economical manufacturing procedures, and since the plates or gratings similarly could not be kept perfectly flat, it is found advantageous to preform the filler sheet, as shown in Fig. 3a, in the course of perforating it to distort the plane surface to what might be described as a quilted contour. This provides a "compressible" sheet which will adapt itself to variations in spacing between the core face and plates or gratings.

For carrying out the process I provide a muff 32 which is conducive to more uniform preheat in almost any of the various types of preheating furnaces which might be utilized, since it shields the outer row of tubes from radiation or contact with circulating air. It also serves as a heat retaining shield to diminish heat losses during transfer from the furnace to the dipping pot, and during the dipping operation. It has the further advantage that during the dipping operation it serves to reduce the likelihood or possibility of having flux splash on the outer row of tubes or of having flux flow over the ring 13 with resultant over-fluxing and over-erosion of the ends of the outer tubes.

In carrying out the process I also provide a holding means 24 in cooperation with a muff means 32. This holding means 24, as shown in Fig. 4, includes reticulated or open work members 25 of an outline or peripheral configuration, enabling them to fit into the spaces provided by the bands 13 as shown in Fig. 5. These members 25 are made from a material repellent to the filler 22, so that the melted filler will not adhere thereto. In the form shown, the members 25 are made from a baked vitreous material and have numerous, preferably evenly spaced, openings 26 therein through which molten flux may pass in carrying out the process hereinafter described.

The holding means 24 also includes cross bars 27 carrying springs 28 which bear against the outer faces of the members 25, and means 29 engaging the ends of the cross bars 27 and urging them relatively inward so that the holding plates 25 will be pressurally applied to the discs of filler material 22 which are disposed directly against the opposite end faces of the tube assembly defined by the lips of the expanded tube ends 12. The means 29 are shown as springs having hooks 30 at the ends thereof to engage openings 31 in the ends of the bars 27. Also, on the cross bar 27 are members 36 spaced so as to bear against the periphery of the muff 32.

As shown in Fig. 4a the muff 32 consists of two sections 32a and 32b having ring sections 33a and 33b held in spaced relation by the sides 34a and 34b so that when assembled, they provide rings 33 in which the tube assembly nests.

A preferred method of performing the process is as follows: Precleaned tubes 11 are assembled with the required number of baffle plates 15 and bands 13. The assembly, as indicated in Fig. 5, is held in a muff 32 by any type of clamping means (not shown). The ring members 33 are held in such spaced relation by the sides 34 and in such positions that they will substantially enclose these bands. After the tube and baffle assembly is placed in the muff 32, the tubes, baffle plates, and bands 13 are degreased and recleaned. This may be accomplished by dipping the assembly in one or more solutions appropriate to this purpose. A precleaned perforated sheet 22 of filler material is then placed against each end of the tube assembly and the holding means 24 is applied as shown in Fig. 5 so that the perforated plates 25 will be forced against the plates 22 of filler material and hold them in contact with the tube ends. A piece of wire 35 of filler material, bent so as to form a circle or ring is placed around the periphery of each sheet 22 of filler material and in contact with the inner surface of these adjacent bands 13.

The assemblage, including the muff, tube assemblage, filler sheets 22 and rings 35, and the holding means 24, is placed in a preheat furnace with the tubes extending vertically. Heat is applied to the assemblage until the temperature of the upper ends of the tubes and the adjacent filler sheet and filler ring is brought to a temperature somewhat above the temperature at which the flux melts, but below the melting point of the aluminum and approximately that of the melting point of the solder or filler metal of the perforated plate 22 and the ring 35. In this example of the use of the process, the melting point of the flux employed is about 1000° F. and the melting point of the filler is 1075° F., the melting point of the metal of the tubes being 1200° F. Accordingly, the assemblage is heated until the upper end thereof is brought to a temperature of between 1075° F. and 1085° F.

In the interim, a body of flux has been heated in a suitable container to a temperature of about 1030° F. so that it is now molten and exists at a temperature capable of deoxidizing the tubes and filler material, and causing the filler material to flow into the interstices between the tube ends.

The next step in the process is to invert the assemblage shown in Fig. 5, so that the heated upper end will now face downward. Without delay, so that there will be no appreciable loss of heat from the assemblage, the lower end of the assemblage is immersed in the molten flux to such depth that the upper level of the molten flux will be slightly above the lower end of the tubes. In Fig. 5 the flux level is shown by the broken line f—f. It is approximately one-eighth of an inch above the lower end of the tubes and is below the upper extremities of the expanded tube ends 12. As the assemblage is lowered to the position indicated, there will be a relative upward movement of the flux from face to face of the lower holder plate 25, then through the holes 23 of the filler body 22, and finally into the interstices between the tube ends and into the hexagonal openings defined by the lower tube ends 12. The lower end of the assemblage is held in the flux only for sufficient time to permit the filler to flow upward into the interstices between the parts by or as the result of capillary action and cohesion between the filler alloy and the aluminum metal parts to be brazed. Ordinarily, the time of immersion is about fifteen seconds, but it will be understood that this time will vary in accordance with the characteristics of the flux employed, with the degree of oxidation of the tubes and filler, and with the temperature of the tubes, the filler, and the molten flux.

Upon being withdrawn from the flux at the completion of the first brazing operation on the assemblage, the assemblage is returned to the heating chamber with its unbrazed end upward, and this end of the assemblage is then brought to a temperature of 1075 to 1085° F. and the dipping process described in the foregoing is repeated, the second end of the assemblage being now immersed in the molten flux. The assemblage is now quenched by blowing air therethrough. The holder 32 is then removed from the assemblage and it is thoroughly cleaned with solutions appropriate to the metal and flux, then dried.

In Fig. 6, which is a composite view, I have illustrated the action which takes place when the lower end of the assemblage is lowered into the molten flux bath. To the left of the center line c—c I have shown the filler plate 22 held against the tube end by the member 25, and to the right of the center line c—c I show how the molten filler material flows up into a small interstice between adjacent walls 17 of adjacent tube ends 12. As shown at A, when the assemblage is first lowered into the molten flux bath, the molten flux will relatively flow upward and first wash the exposed faces of the filler material. A portion of the flux will then flow into the lower end of the interstice 40 between adjacent walls 17, and then, by capillary action, will be drawn upward, above the level f—f of the flux bath, fluxing and deoxidizing the metal surfaces. Simultaneously the flux will deoxidize the filler material of the plate 22 and, through the phenomena of capillary action and cohesion between the filler material and the aluminum of the wall 17, the molten filler material will flow upward in the interstice 40 as shown at B of Fig. 6 to the point of transition 20 and a fillet will be formed as indicated at 21.

The flux used is effective in the melting temperature range of the filler so that the preheat temperature and flux temperature may both be at or slightly above the melting point of the filler. It is usually necessary to carry on this operation at temperatures somewhat above that of the filler melting point in order to counteract heat loss and, in case the filler has been left in the preheat just to the melting point without complete melting, it is necessary for the flux to supply the additional heat of fusion required to render the filler entirely liquid.

Another variant of the double preheat, double dip procedure is one in which a flux not effective at temperatures below 1100° F. but in a range upwards to 1125° F. to 1140° F. is used to obtain rapid enough fluxing action for use with this process. Since this flux must be used at temperatures materially in excess of the melting point of the filler, and at such temperature that the alloying and diffusion of filler material with and into the thin tube wall may proceed at an undesirably rapid rate, the tube assembly is preheated to a slightly lower temperature, 1065° F. to 1075° F. Upon dipping the assembly into the hot flux, a rapid deoxidization of the surface of the filler material is obtained and the flux is somewhat cooled thereby. At the same time, the necessary heat of fusion for the filler material is supplied by this flux and heat is supplied to the tube ends, resulting in further cooling. The brazing operation therefore proceeds upon a transient time-temperature basis with the filler material and tubes being heated through the melting range into the range of sufficient fluidity for capillary flow and the flux being proportionately cooled.

Still another practice of my invention which involves the more rapid consumption of flux consists in first heating the entire assemblage to a temperature equal to the melting point of the filler, but below the melting point of the aluminum, and then immersing the entire assemblage in a body of molten flux at a temperature preferably slightly above the melting point of the filler material, for just a sufficient time to effect necessary deoxidation of the tubes and filler material and produce melting of the filler material so that it will flow into the interstices between the parts to be brazed. In this practice of the invention all of the surfaces of the assemblage are coated with molten flux which is lost when the assemblage is subsequently cleaned.

In Fig. 4 and Fig. 5 I have shown the holding plate 25 as comprising a perforated disc of suitable material, such as porcelain, for example. In Fig. 7 I show that the holding plate may be readily made up as a composite structure comprising a metal frame 45 having spaced bars 46, the frame and bars having slots or channels 47 aligned in parallel rows to receive bars 48 or 48a of insulating material, such as fired porcelain. These bars 48 and 48a have openings 49 from end to end thereof, and to secure the bars in place in the slots or channels 47, wires 50 may be passed through the openings 49 and then tied around the outer part of the frame structure. For holding means the frame structure 45 has projecting ends 52 with openings 53 to serve the same purpose as the openings 31 of the bars 27 of Fig. 4 and Fig. 5. When the holding means shown in Fig. 7 is in use, the edges 54 of the bars 48 or 48a engage the disc of filler material 22 to hold the same against the end face of the tube assembly.

I claim as my invention:

1. A method of brazing together the enlarged, thin walled end portions of an assembly of tubes disposed with said ends in side by side relation, wherein a solidified flux-pervious filler is held against the face of said assembly and wherein the end of the assembly with said filler thereagainst, in such heated state that the temperature thereof is near the melting point of the filler but lower than the melting point of the end portions of the tubes, is immersed while still in heated condition in a body of molten flux existing at a temperature at or above the melting point of the filler in the presence of the flux a distance not greater than the length of said end portions of said tubes, so that the flux will flow relatively upward across the faces of the filler and into the interstices to be filled with the filler and heat from the flux will melt the filler so that the same will then flow into said interstices.

2. The steps in the method of brazing together the ends of an assembly of metal parts disposed in side by side relation, comprising: applying a body of solidified flux-pervious filler against the face of said assembly; applying a pervious grid of ceramic material against said body of filler and securing said grid to said assembly with said body of filler held between the grid and the assembly; preheating at least the end portions of the assembly while the filler is thus held thereagainst to a temperature equal to or slightly higher than the melting point of the filler but lower than the melting point of the metal parts; and then immersing the assembly while still in a heated condition in a body of molten flux having a temperature at or slightly above the melting point of the filler in the presence of the flux so that the flux will flow relatively upward across the face of the filler and into the interstices to be filled with the filler and so that the filler will melt and likewise flow upwardly into said interstices.

3. The steps in a method of brazing together the end portions of an assembly of thin walled aluminum tubes disposed in side by side relation, comprising: securing a sheet of flux-pervious brazing material between a face of said assembly and a flux-pervious grid of material to which the brazing material will not adhere; preheating the assembly, with the brazing material thus secured thereto, to a temperature equal to or slightly higher than the melting point of the brazing material but lower than the melting point of the end portions of the tubes; and then, while the assembly is still in a heated condition, immersing at least said end portions of the tubes in a body of molten flux existing at a temperature at or slightly above the melting point of the brazing material in the presence of the flux, so that the flux will flow upwardly through the pervious body of brazing material and into the interstices to be filled therewith, and so that the brazing material will be melted and will likewise flow upwardly into said interstices.

4. The steps in a method of brazing together the ends of an assembly of thin walled aluminum tubes disposed in side by side relation, comprising: securing a sheet of solidified flux-pervious brazing material between a face of said assembly and a flux-pervious grid of refractory material to which the brazing material will not adhere; preheating the assembly, with the brazing material thus secured thereto, to a temperature equal to or slightly higher than the melting point of the brazing material but lower than the melting point of the tube ends; and then, while the assembly is still in a heated condition, immersing at least the end portions of the tubes in a body of molten flux existing at a temperature at or slightly above the melting point of the brazing material in the presence of the flux a distance not greater than the length of said tube ends, so that the flux will flow upwardly through the pervious body of brazing material and into the interstices to be filled therewith, and so that the brazing material will be melted and will likewise flow upwardly into said interstices.

5. A method of brazing together the end portions of an assembly of metal parts disposed in side by side relation, wherein a solidified flux-pervious filler is held against the face of said assembly, the assembly is heated so that at least the end thereof adjacent said filler is brought to a temperature equal to or slightly below the melting point of the brazing filler, but lower than the melting point of the metal forming the end portions of said metal parts, then the end of the assembly with the filler held thereagainst is immersed while still in heated condition in a body of molten flux existing at a temperature slightly above the melting point of the filler so that the flux will flow relatively upward across the faces of the filler and into the interstices to be filled with the filler and heat from the flux will melt the filler so that the same will then flow into said interstices.

6. The steps in the method of brazing together the ends of an assembly of metal parts disposed in side by side relation, comprising: applying a body of solidified filler against the face of said assembly; resiliently securing a member repellent to filler material against the body of the filler and securing said member to the assembly with the body of the filler held between said member and said assembly; preheating at least the end portions of the assembly while the filler is thus held thereagainst to a temperature equal to or slightly higher than the melting point of the filler but lower than the melting point of the metal parts; and then immersing the assembly while still in a heated condition in a body of molten flux having a temperature at or slightly above the melting point of the filler so that said flux will flow into the interstices to be filled with said filler and said filler will melt and likewise flow into said interstices.

BRUCE BURNS.

REFERENCES CITED

The following references are of record in the file of this patent:

UNITED STATES PATENTS

| Number | Name | Date |
| --- | --- | --- |
| 1,608,735 | Haas | Nov. 30, 1926 |
| 2,001,186 | Dornier | May 14, 1935 |
| 2,061,850 | Roberts | Nov. 24, 1936 |
| 2,191,631 | Shutts et al. | Feb. 27, 1940 |
| 2,270,864 | Blais | Jan. 27, 1942 |
| 2,298,996 | Woods | Oct. 13, 1942 |
| 2,313,315 | Blais | Mar. 9, 1943 |